(12) United States Patent
Schubert et al.

(10) Patent No.: US 9,010,728 B2
(45) Date of Patent: Apr. 21, 2015

(54) GATE VALVE COMPRISING A VALVE BODY

(71) Applicant: Phönix Armaturen-Werke Bregel GmbH, Volkmarsen (DE)

(72) Inventors: Matthias Schubert, Hofgeismar (DE); Gunter Wodara, Bad Arolsen (DE); Hannes Kellermann, Kassel (DE)

(73) Assignee: Phönix Armaturen-Werke Bregel GmbH, Volkmarsen (DE)

( * ) Notice: Subject to any disclaimer, the term of this patent is extended or adjusted under 35 U.S.C. 154(b) by 51 days.

(21) Appl. No.: 13/856,188

(22) Filed: Apr. 3, 2013

(65) Prior Publication Data

US 2014/0306134 A1 Oct. 16, 2014

(30) Foreign Application Priority Data

Apr. 3, 2012 (EP) ..................................... 12002428

(51) Int. Cl.
*F16K 3/00* (2006.01)
*F16K 31/44* (2006.01)
*F16K 51/00* (2006.01)
*F16K 31/04* (2006.01)
*F16K 31/50* (2006.01)
*F16K 3/12* (2006.01)

(52) U.S. Cl.
CPC .............. *F16K 31/04* (2013.01); *F16K 31/508* (2013.01); *F16K 3/12* (2013.01)

(58) Field of Classification Search
CPC ......... F16K 3/30; F16K 3/3165; F16K 3/316; F16K 31/50; F16K 31/508
USPC .......................... 251/326, 274, 248, 284, 285
See application file for complete search history.

(56) References Cited

U.S. PATENT DOCUMENTS

| | | | | | |
|---|---|---|---|---|---|
| 2,515,498 | A | * | 7/1950 | De Craene et al. | 74/520 |
| 5,271,602 | A | * | 12/1993 | Funaba | 251/335.3 |
| 6,446,660 | B1 | * | 9/2002 | Goni Usabiaga | 137/243.6 |
| 2003/0010953 | A1 | * | 1/2003 | Coppock | 251/326 |
| 2003/0038266 | A1 | * | 2/2003 | Hallden et al. | 251/266 |

FOREIGN PATENT DOCUMENTS

| | | |
|---|---|---|
| DE | 1226847 B | 10/1966 |
| DE | 2635688 A1 | 2/1978 |
| DE | 3342998 A1 | 7/1984 |
| DE | 10014796 A1 | 10/2001 |

* cited by examiner

*Primary Examiner* — John K Fristoe, Jr.
*Assistant Examiner* — Michael R Reid
(74) *Attorney, Agent, or Firm* — Gifford Krass, Sprinkle, Anderson & Citkowski, P.C.; Douglas L. Wathen

(57) ABSTRACT

A gate valve includes a valve body and a spindle drive. The spindle drive has, at its one end, a wedge for blocking a pipe. The spindle drive includes a motor-driven spindle, wherein, wherein the spindle is connected by way of a coupling to a shaft in an axially displaceable manner, and the shaft has the wedge at its end.

9 Claims, 2 Drawing Sheets

GATE VALVE COMPRISING A VALVE BODY

CROSS-REFERENCE TO RELATED APPLICATION

This application claims priority of European Patent Application EP 12 002 428.6 filed Apr. 3, 2012, the content of which is incorporated herein in its entirety.

FIELD OF THE INVENTION

The invention relates to a gate valve comprising a valve body and a spindle drive. The spindle drive has, at its one end, a wedge for blocking a pipe, wherein the spindle drive comprises a motor-driven spindle.

A gate valve of the type mentioned in the introduction is known from the prior art. Such gate valves are built into pipes of different nominal sizes, wherein a pipe can be blocked by a gate valve. Such a gate valve comprises a valve body that is built into a pipe, which means that the pipe is flanged onto the valve body on both sides. A wedge is provided in the valve body, which is insertable into a corresponding wedge receptacle in the valve body via a spindle drive in order to block the pipe. As expressed by the term "wedge", the wedge is hereby configured to be wedge-shaped in the direction of insertion into the wedge receptacle. In order to achieve a complete blocking, it is provided that the wedge and the wedge receptacle for the wedge have sealing elements on their facing surfaces.

The spindle drive is mainly motor-driven. Such spindle drives must be very effective, which is more specifically embodied by the fact that the spindle of the spindle drive is mostly formed from a high strength tool steel. However, it is also known that highly corrosive media are transported in the pipes to be blocked. Tool steel has indeed high strength but it is not resistant to corrosion.

SUMMARY OF THE INVENTION

Therefore, the object underlying the invention is to provide a spindle drive for a gate valve, which not only meets the requirements regarding corrosion resistance but also has the solidity required for a failure-free operation of a spindle drive.

In order to solve the object, it is proposed according to the invention that the spindle is connected by a coupling in an axially displaceable manner to a shaft, wherein the shaft is connected to the wedge. Herein, "axially displaceable" means a displacement in the direction of the longitudinal axis of the spindle, respectively of the shaft.

From this, it becomes clear that the part of the spindle drive that comprises the actual spindle is made of a high strength tool or screw steel, wherein the shaft, which is displaceable by the spindle, is manufactured from a corrosion resistant material, for example stainless steel. This means that two different components are coupled to each other by the coupling. Together with the drive, the spindle provides for the displacement of the shaft, the shaft transmits the axial movement of the spindle to the wedge in the area of the part of the valve body conducting the medium.

It is more specifically provided that the coupling has a coupling bar with a sleeve, wherein the coupling bar is displaceably guided by at least one column extending parallel to the spindle drive. The coupling bar is thus not only a part of the connection of the two parts of the spindle drive, namely the actual spindle, which is drivable by a motor, and the shaft, at the end of which the wedge is attached, but the coupling bar also provides for a guiding of the spindle drive.

Regarding the connection of the ends of the spindle and of the shaft by the coupling bar, the following must be mentioned:

The sleeve of the coupling bar captures respectively the end of the shaft and of the spindle and connects them in such a manner that axial forces are transferable. The connection of the ends of the spindle and of the shaft by the sleeve of the coupling bar can hereby occur with a force or positive-fit. In a positive-fit connection, the ends of the spindle and of the shaft respectively have a circumferential groove, wherein the sleeve has corresponding protrusions on the inner side of the sleeve, which engage with the previously described grooves. In this respect, the sleeve in the coupling bar makes it possible to transfer axial forces such as occur for example when the wedge is pulled out of the wedge receptacle. Hereby, it is pointed out that neither the spindle nor the shaft rotate. Both parts merely execute a longitudinal movement.

It has already been pointed out that the spindle drive comprises a motor-driven spindle. The motor drive comprises a motor and a screw drive that receives the spindle.

Such a motor-driven spindle comes with a control that ultimately ensures that depending on a predetermined spindle path, the motor is stopped. If the control is defective, the wedge is pressed by the motor into the receptacle for the wedge in the pipe. Hereby, it can happen that the spindle drive bulges, with the consequence that the spindle drive is damaged. Due to the fact that the spindle is guided by the column extending parallel to the spindle drive during the movement of the spindle, a bulging can be avoided even in case of an over-rev of the drive.

According to another advantageous feature, it is provided that the column has at least one bottom limit stop and preferably also a top limit stop for the coupling bar, which ensures that the wedge is not pressed by the spindle drive into the wedge receptacle in the valve body with an unduly high force, which would ultimately lead to damage or destruction of the seals therein.

According to another feature of the invention, the coupling bar comprises two bar portions, which form a bushing in the area of the column, wherein the bushing comprises a slide or ball bearing. This makes it possible to have an essentially smooth and extremely precise guiding of the spindle drive by the column disposed on the body of the valve parallel to the spindle drive.

The screw drive can be configured as a planetary or roller screw drive. It transforms the rotational movement of the drive motor into an axial movement of the spindle. Both types of screw drives are characterized by a high load capacity, great durability and great dependability. Furthermore, such drives have a very high repeat accuracy for small travelling distances.

In the following, the invention is exemplarily described in more detail based on the drawings.

DETAILED DESCRIPTION

Figure 1:
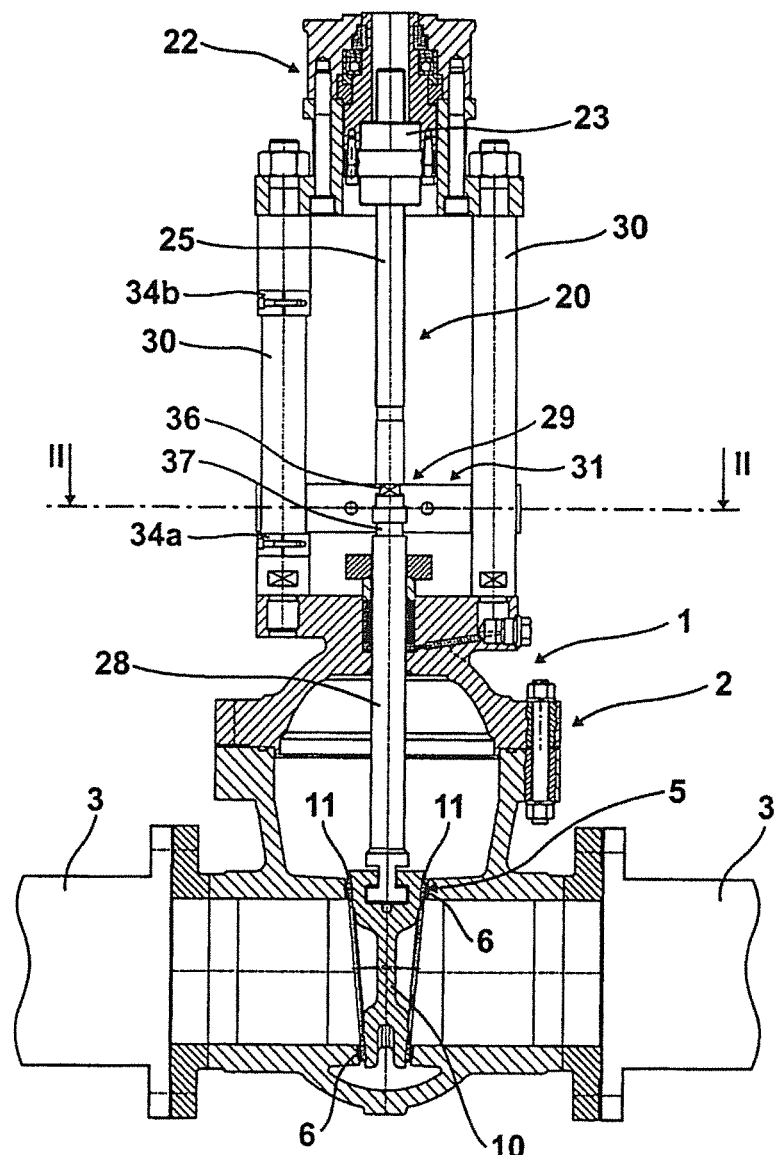
FIG. 1 is a cross-sectional of a gate valve in accordance with the present invention.
Figure 2:
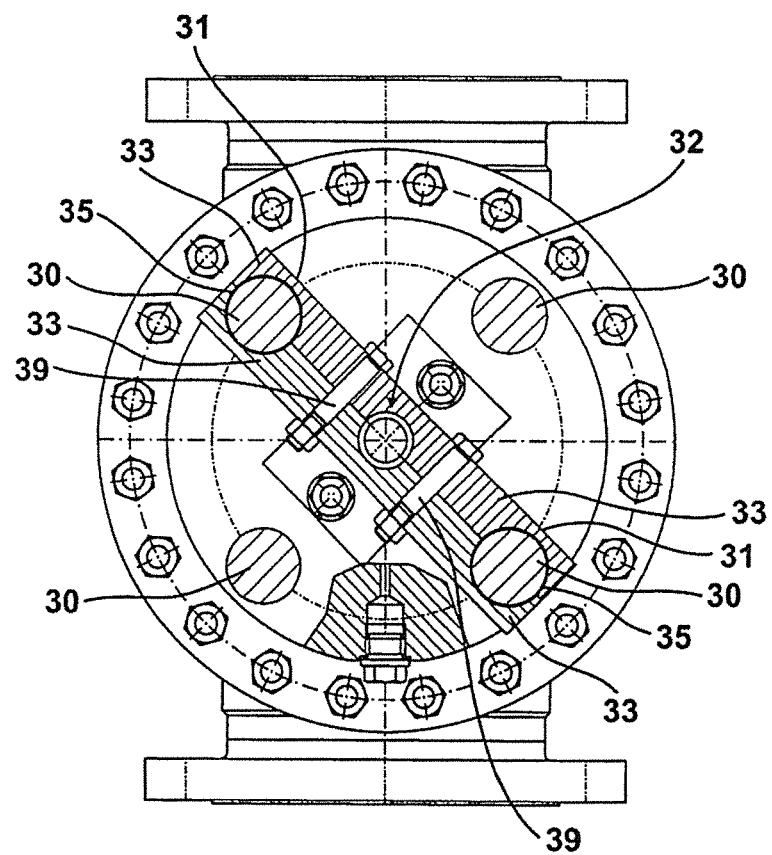
FIG. 2 is a sectional view of the valve taken along line II-II from FIG. 1.

The gate valve 1 has the valve body 2, which is inserted in a pipe 3. The pipe 3 is flanged onto both sides of the valve body. The valve body 2 has a wedge receptacle 5 for receiving a wedge 10. The wedge 10 is inserted in a sealed manner in the wedge receptacle, wherein seals 11 disposed on the wedge and seals 6 disposed on the wedge receptacle are provided for sealing. The spindle drive 20 is connected to the wedge 10, which in the view according to the cross-section of the pipe has approximately a circular shape. The spindle drive 20 is mounted in a spindle head 22. A screw drive 23 is provided in the spindle head 22 for holding the spindle, the spindle drive serving together with a motor (not shown) to drive the spindle 25 of the spindle drive. The spindle head 22 is connected to the valve body 2 by four columns 30 (FIG. 2). The screw drive may be configured as a roller or as a planetary roller screw drive. The shaft 28 is adjacent to the spindle 25 and is connected with the spindle 25 of the spindle drive 20 via a coupling 29. The spindle consists of a high strength tool or screw steel, whereas the shaft is formed from a corrosion resistant material, for example a stainless steel.

As has already been explained, the spindle head 22 is connected with the valve body 2 by at least two, preferably four, columns 30 running parallel to each other., wherein a A coupling bar 31 is provided, which displaceably connects the spindle drive 20 with two columns 30. In order to ensure a sliding of a coupling bar 31 on the column 30, a bearing bush bushing 35 in the form of a slide bearing or a corresponding ball or roll bearing (FIG. 2) is provided in the coupling bar in the area of each column 30.

It has already been pointed out that the drive motor has a control, which ensures that when the wedge 10 has reached its end position in the wedge receptacle 5, the motor (not shown) is stopped. In case the control malfunctions, a bottom limit stop 34a and a top limit stop 34b is provided in the area of the ends of at least one column 30, against which the coupling bar 31 abuts when the motor attempts to over-rev the spindle. Thus it is prevented on the one hand that the wedge 10 is pressed with an excessive force into the wedge receptacle 5, which would damage at least the seals 6, 11 or even the entire wedge or the wedge receptacle in the valve body.

On the other hand, the coupling bar prevents the spindle drive 20 from bulging in case of an over-rev of the motor. This means that the coupling bar stabilizes the spindle drive more specifically in case the control for stopping the spindle drive does not stop the drive after having travelled along determined path.

Furthermore, the coupling bar 31 forms the coupling together with a sleeve 32 disposed in the area of the ends of the shaft and of the spindle. The two ends of the spindle and of the shaft are held together by the sleeve of the coupling bar so that they transfer a force in the axial direction (FIG. 2). To this end, the two portions 33 of the coupling bar 31 are connected to the sides of the sleeve 32 by a screw connection 39.

Regarding the connection between the spindle and the shaft, which transfers a force in the axial direction, the following must be explained. The ends of the spindle and of the shaft stand above each other so that they are aligned. In the area of the sleeve 32 of the coupling bar, the shaft and the spindle both have a groove, more specifically a circumferential groove 36, 37. The sleeve engages with these grooves with corresponding protrusions (not shown), so that a positive-fit connection is formed by the sleeve of the coupling bar between the spindle and the shaft.

List of Reference Numbers
1 gate valve
2 valve body
3 pipe
5 wedge receptacle
6 seal
10 wedge
11 seal
20 spindle drive
22 spindle head
23 screw drive
25 spindle
28 shaft
29 coupling
30 column
31 coupling bar
32 sleeve
33 portions
34a bottom limit-stop
34b top limit-stop
35 bushing
36 circumferential groove in the spindle
37 circumferential groove in the axis
39 screw connection for the bar shells

The invention claimed is:

1. A gate valve, comprising:
a valve body having a wedge receptacle;
a wedge received in the wedge receptacle to close the valve;
a spindle drive having a drive portion and a spindle driven by the drive portion;
at least one column extending parallel to the spindle drive;
a shaft connected to the wedge, the shaft formed of a corrosion resistant material;
a coupling connecting the spindle to the shaft in an axially displaceable manner, the coupling including a coupling bar displaceably guided by the at least one column and a sleeve disposed in the coupling bar, the sleeve being connected to the spindle and to the shaft by axial force-fit connections; and
the column further having at least one bottom limit-stop for the coupling bar.

2. A gate valve in accordance with claim 1, wherein:
the coupling bar includes two portions and a bushing wherein the coupling bar is guided by the column.

3. A gate valve in accordance with claim 2, wherein:
the bushing comprises a slide bearing.

4. A gate valve in accordance with claim 2, wherein:
the bushing comprises a ball bearing.

5. A gate valve in accordance with claim 1, wherein:
the spindle and the shaft each have grooves defined therein; and
the sleeve has protrusions engaging the grooves.

6. A gate valve in accordance with claim 1, wherein:
the drive portion of the spindle drive is a roller screw drive.

7. A gate valve in accordance with claim 1, wherein:
the drive portion of the spindle drive is a planetary roller screw drive.

8. A gate valve in accordance with claim 1, wherein the spindle is formed of a different material from the shaft.

9. A gate valve in accordance with claim 8, wherein the spindle is formed of high strength tool steel or screw steel.

* * * * *